United States Patent
Manda

(10) Patent No.: US 10,097,735 B2
(45) Date of Patent: Oct. 9, 2018

(54) IMAGE FORMING APPARATUS THAT ENSURES HIGHLY ACCURATE COLOR CONVERSION TO INPUT IMAGE WITH GRADATION, AND RECORDING MEDIUM THEREFOR

(71) Applicant: Kyocera Document Solutions Inc., Osaka (JP)

(72) Inventor: Etsuko Manda, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 15/609,840

(22) Filed: May 31, 2017

(65) Prior Publication Data
US 2017/0346991 A1    Nov. 30, 2017

(30) Foreign Application Priority Data
May 31, 2016    (JP) .................................. 2016-108181

(51) Int. Cl.
*H04N 1/60* (2006.01)
*H04N 1/64* (2006.01)

(52) U.S. Cl.
CPC ........... *H04N 1/6027* (2013.01); *H04N 1/603* (2013.01); *H04N 1/6008* (2013.01); *H04N 1/6019* (2013.01); *H04N 1/6075* (2013.01); *H04N 1/642* (2013.01); *H04N 2201/0094* (2013.01)

(58) Field of Classification Search
CPC ......................... H04N 1/6027; H04N 1/6058
See application file for complete search history.

(56) References Cited

U.S. PATENT DOCUMENTS

| | | | | |
|---|---|---|---|---|
| 2005/0208407 A1* | 9/2005 | Nagase | ............... | G03G 9/0825 430/108.21 |
| 2010/0165364 A1* | 7/2010 | Qiao | ..................... | H04N 1/603 358/1.9 |

FOREIGN PATENT DOCUMENTS

JP    2013-219522 A    10/2013

* cited by examiner

*Primary Examiner* — King Poon
*Assistant Examiner* — Michael Burleson
(74) *Attorney, Agent, or Firm* — James Judge

(57) ABSTRACT

An image forming apparatus includes a table generating unit. The table generating unit, in a Voronoi diagram, obtains empty circles as circles centered at Voronoi seeds of ends of Voronoi sides that intersect with a straight line passing through a largest saturation color and a smallest-saturation and specific-lightness color and passes through generatrices. After the table generating unit sets one of the generatrices shared by the two adjacent empty circles whose radius ratio is outside a specific range as a target point, and causes the radius ratio of the two empty circles to be within the specific range by changing at least one radius of the two empty circles, the table generating unit generates the conversion table that sets a color that corresponds to an intersection point corresponding to the target point among the intersection points of the two empty circles, as the definition colors.

3 Claims, 15 Drawing Sheets

IMAGE FORMING APPARATUS THAT ENSURES HIGHLY ACCURATE COLOR CONVERSION TO INPUT IMAGE WITH GRADATION, AND RECORDING MEDIUM THEREFOR

INCORPORATION BY REFERENCE

This application is based upon, and claims the benefit of priority from, corresponding Japanese Patent Application No. 2016-108181 filed in the Japan Patent Office on May 31, 2016, the entire contents of which are incorporated herein by reference.

BACKGROUND

Unless otherwise indicated herein, the description in this section is not prior art to the claims in this application and is not admitted to be prior art by inclusion in this section.

A typical image forming apparatus such as a multi-function peripheral (MFP) and a copy-only machine includes various kinds of color conversion tables and color-adjustment functions to convert an input image into an output image for printing. However, even for an input image with a gradation in which its tone smoothly changes, converting the input image into an output image by some color tables and color-adjustment functions causes such image forming apparatus to generate an output image where tone jump or tone collapse occurs, namely an output image in which tone does not smoothly change.

There is known a method for generating an output image in which tone smoothly changes from an input image with gradation in which its tone smoothly changes. This method prepares a plurality of interpolation methods such as linear interpolation, nearest-neighbor interpolation, and spline interpolation with respect to primary colors, namely cyan, magenta, yellow, and black. Among the plurality of interpolation methods, this method decides which interpolation method is appropriate as the interpolation method relative to each of the grid points of the primary colors in a color conversion table. Then, as the interpolation method relative to each of the grid points of colors that are a secondary (or more) color in the color conversion table, this method identifies a combination of the interpolation methods for the grid points of the primary colors, which constitute the colors.

SUMMARY

An image forming apparatus according to one aspect of the disclosure includes a central processing unit (CPU), a storage device, and a print device. The storage device stores an image forming program. The print device executes printing on a recording medium. The CPU executes the image forming program to function as a table generating unit and a color conversion unit. The table generating unit generates a second color conversion table based on a first color conversion table. The first color conversion table defines a correspondence relationship between color values of a colorimetric system of an input image and color values of a colorimetric system of an output image for printing by the print device, with respect to a specific count of colors. The color conversion unit converts the input image into the output image using the second color conversion table generated by the table generating unit. The table generating unit, in a Voronoi diagram in a specific hue plane that includes generatrices corresponding to definition colors defined in the first color conversion table, obtains empty circles as circles centered at Voronoi seeds of ends of Voronoi sides that intersect with a straight line passing through a largest saturation color and a smallest-saturation and specific-lightness color and passes through generatrices. The circle is without the generatrix inside the circle. After the table generating unit, among the obtained empty circles, sets one of the generatrices shared by the two adjacent empty circles whose radius ratio is outside a specific range as a target point, and causes the radius ratio of the two empty circles to be within the specific range by changing at least one radius of the two empty circles while the generatrix other than the target point is fixed, the table generating unit generates the second color conversion table that sets a color that corresponds to an intersection point corresponding to the target point among the intersection points of the two empty circles, as the definition colors.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
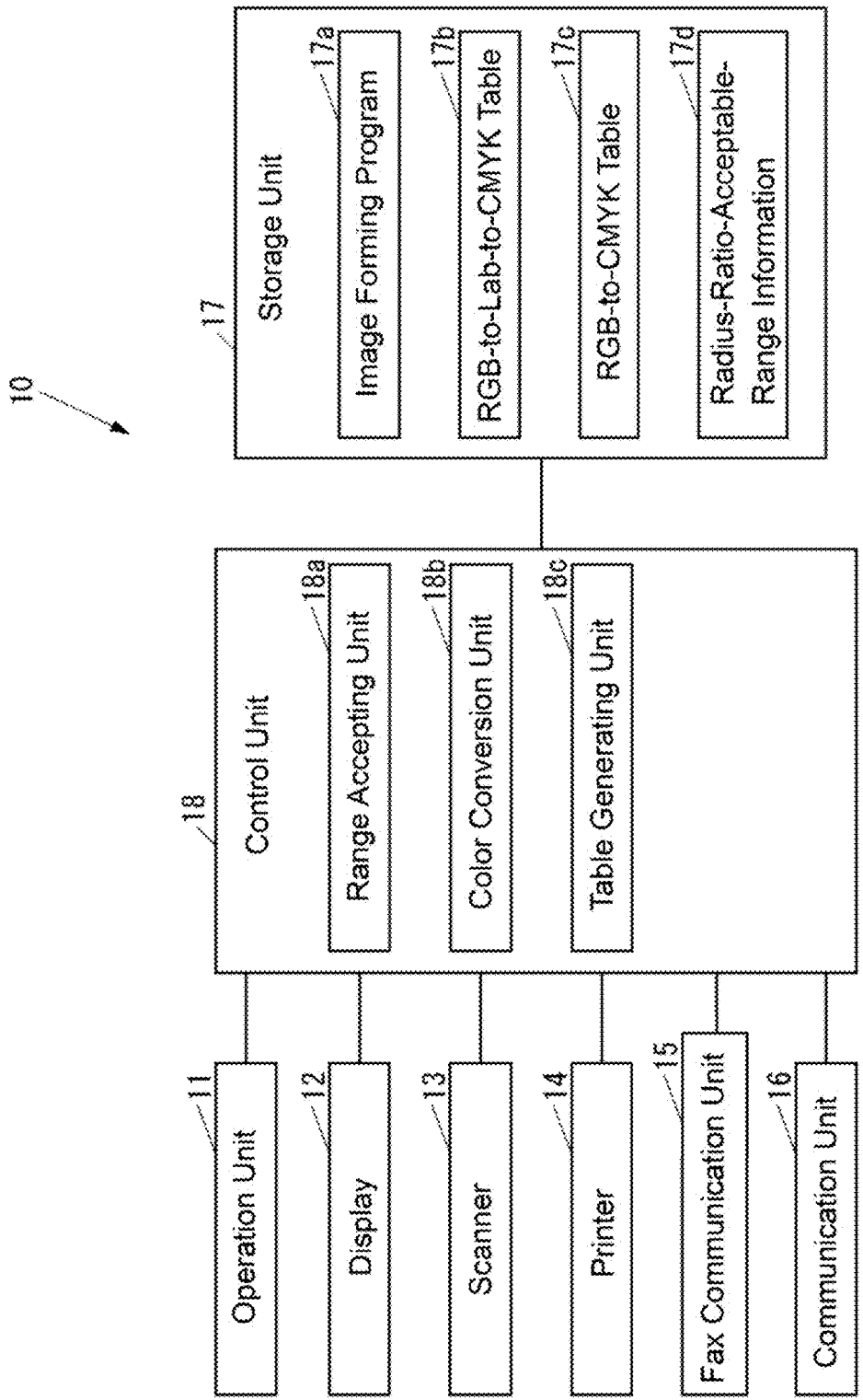
FIG. 1 illustrates a block diagram illustrating a configuration of an MFP according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes one embodiment of the disclosure referring to the accompanying drawings.

First, a description will be given of a configuration of a multi-function peripheral (MFP) as an image forming apparatus according to the embodiment.

FIG. 1 illustrates a block diagram illustrating a configuration of an MFP 10 according to the embodiment.

As illustrated in FIG. 1, the MFP 10 includes an operation unit 11, a display 12, a scanner 13, a printer 14, a fax communication unit 15, a communication unit 16, a storage unit 17, and a control unit 18. The operation unit 11 is an input device such as a button with which the user inputs various kinds of operations. The display 12 is a display device such as a liquid crystal display (LCD) that displays various kinds of information. The scanner 13 is a reading device that reads an image from a document. The printer 14 is a print device that executes printing on a recording medium such as a paper sheet. The fax communication unit 15 is a fax device that performs fax communication with an external facsimile device (not illustrated) via a communication line such as a dial-up line. The communication unit 16 is a communication device that communicates with an external device via a network such as a local area network (LAN) or the Internet, or directly communicates with an external device by wired communication or wireless communication without a network. The storage unit 17 is a storage device such as a semiconductor memory and a hard disk drive (HDD). The control unit 18 controls the whole MFP 10.

The storage unit 17 stores an image forming program 17a executed by the control unit 18. The image forming program 17a may be installed into the MFP 10 at production stage of the MFP 10, may be additionally installed into the MFP 10 from a storage medium such as a SD card, or a universal serial bus (USB) memory, or may be additionally installed into the MFP 10 from a network.

The storage unit 17 stores an RGB-to-Lab-to-CMYK table 17b as a first color conversion table that defines a correspondence relationship between color values of an RGB colorimetric system as a colorimetric system of an input image, namely RGB values, color values of a Lab colorimetric system as a colorimetric system that is independent of a device, namely Lab values, and color values of a CMYK colorimetric system as a colorimetric system of an output image for printing by the printer 14, namely CMYK values, with respect to a specific count of colors.

The storage unit 17 can store an RGB-to-CMYK table 17c as a second color conversion table that defines a correspondence relationship between the RGB value and the CMYK value with respect to a specific count of colors.

The storage unit 17 stores radius-ratio-acceptable-range information 17d that indicates an acceptable range (hereinafter referred to as "a radius-ratio acceptable range") of a ratio of radii (hereinafter referred to as "an adjacent-empty-circle-radius ratio") of two adjacent empty circles (described later). An upper-limit value of the radius-ratio acceptable range is a numerical value that is one or more. When the upper-limit value of the radius-ratio acceptable range is expressed by a, a lower-limit value of the radius-ratio acceptable range is expressed by 1/a. That is, the radius-ratio acceptable range is a range that is 1/a or more and a or less. Consequently, the radius-ratio-acceptable-range information 17d is indicated by the upper-limit value of the radius-ratio acceptable range.

The control unit 18 includes, for example, a central processing unit (CPU), a read-only memory (ROM) that stores programs and various data, and a random-access memory (RAM) that is used as a work area of the CPU. The CPU executes the program stored in the ROM or the storage unit 17.

By executing the image forming program 17a stored in the storage unit 17, the control unit 18 functions as a range accepting unit 18a, a color conversion unit 18b, and a table generating unit 18c. The range accepting unit 18a accepts a designation of the radius-ratio acceptable range. The color conversion unit 18b converts an input image into an output image by using the RGB-to-Lab-to-CMYK table 17b or the RGB-to-CMYK table 17c. The table generating unit 18c generates the RGB-to-CMYK table 17c.

Next, a description will be given of operations of the MFP 10.

First, a description will be given of operations of the MFP 10 when setting the radius-ratio acceptable range.

Figure 2:
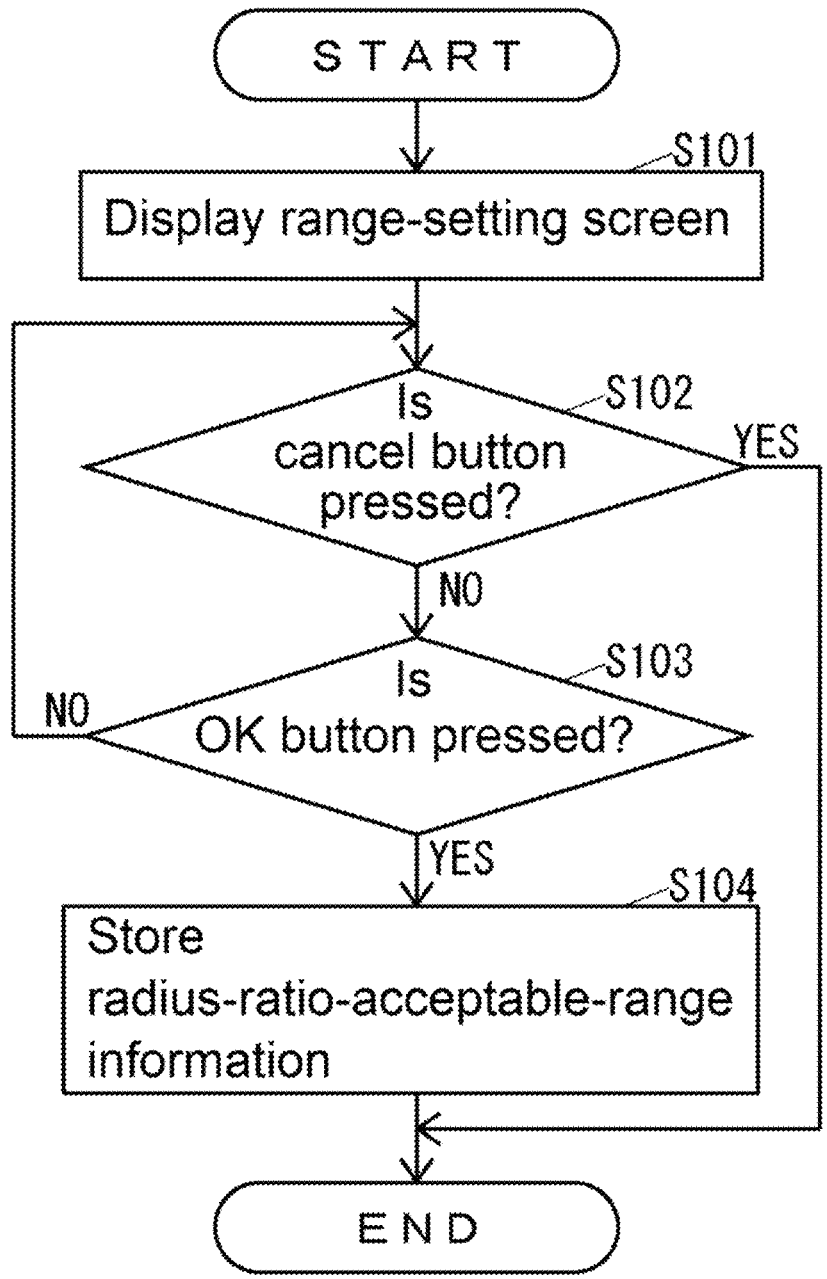
FIG. 2 illustrates operations of the MFP according to the one embodiment when setting a radius-ratio acceptable range.

Instruction of a start of setting the radius-ratio acceptable range via the operation unit 11 causes the control unit 18 to execute the operations illustrated in FIG. 2.

FIG. 2 illustrates the operations of the MFP 10 when setting the radius-ratio acceptable range.

As illustrated in FIG. 2, the range accepting unit 18a displays a range-setting screen 20 (see FIG. 3) for setting the radius-ratio acceptable range in the display 12 (Step S101).

Figure 3:
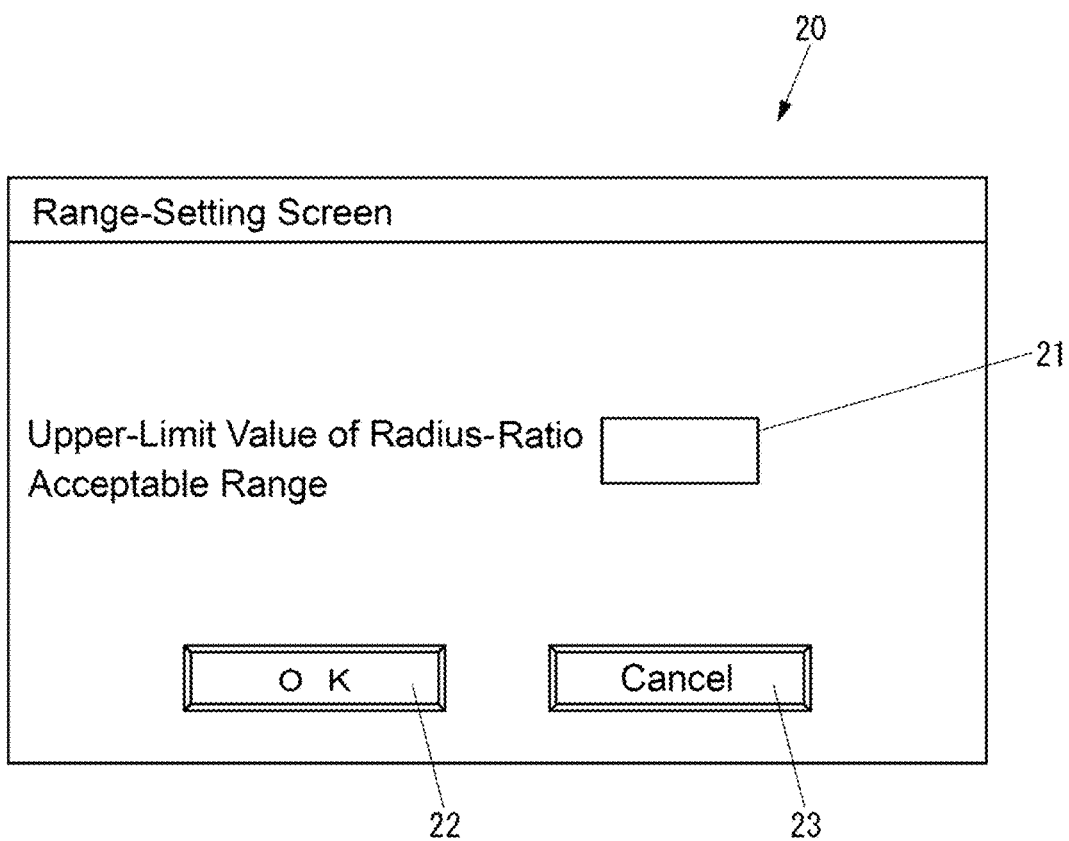
FIG. 3 illustrates one example of a range-setting screen displayed in the operations illustrated in FIG. 2.

The range-setting screen 20, which is illustrated in FIG. 3, includes a text box 21 for receiving the upper-limit value of the radius-ratio acceptable range, an OK button 22 for accepting the radius-ratio acceptable range, and a cancel button 23 for canceling the acceptance of the radius-ratio acceptable range. The text box 21 enables an input of a numerical value that one or more.

As illustrated in FIG. 2, the range accepting unit 18a determines whether the cancel button 23 is pressed or not (Step S102).

When determining that the cancel button 23 is pressed at Step S102, the range accepting unit 18a terminates the operations illustrated in FIG. 2.

When determining that the cancel button 23 is not pressed at Step S102, the range accepting unit 18a determines whether the OK button 22 is pressed or not (Step S103).

When determining that the OK button 22 is not pressed at Step S103, the range accepting unit 18a executes the process of Step S102.

When determining that the OK button 22 is pressed at Step S103, the range accepting unit 18a stores the numerical value received in the text box 21 as the radius-ratio-acceptable-range information 17d (Step S104).

After terminating the process of Step S104, the range accepting unit 18a terminates the operations illustrated in FIG. 2.

Next, a description will be given of operations of the MFP 10 when execution of printing based on an input image with gradation is instructed.

Figure 4:
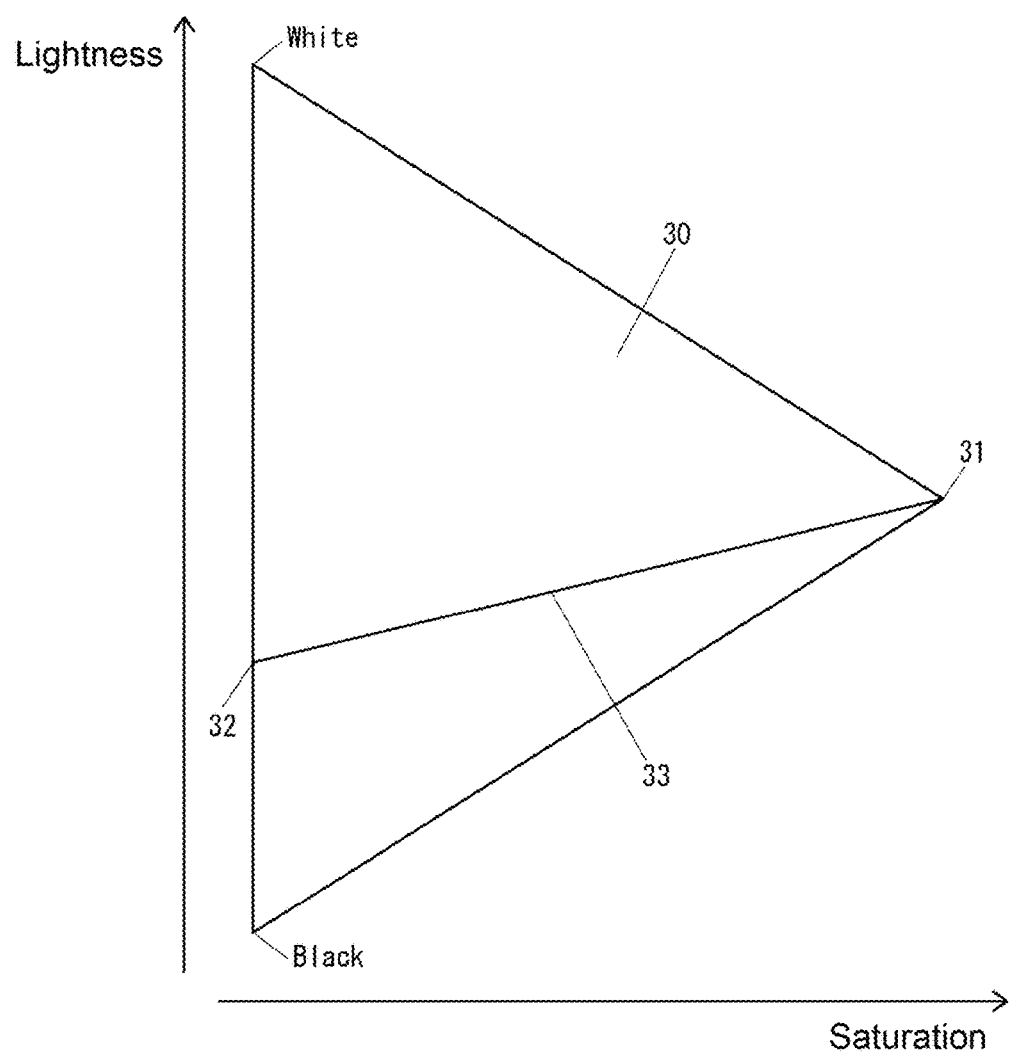
FIG. 4 illustrates one example of colors that constitute an input image with gradation handled by the MFP according to the one embodiment.

In the embodiment, an input image with gradation is, as illustrated in FIG. 4, an image that is constituted of colors on a straight line 33, which passes through a largest saturation color 31 and a smallest-saturation and specific-lightness color 32, in a specific hue plane 30.

Figure 5:
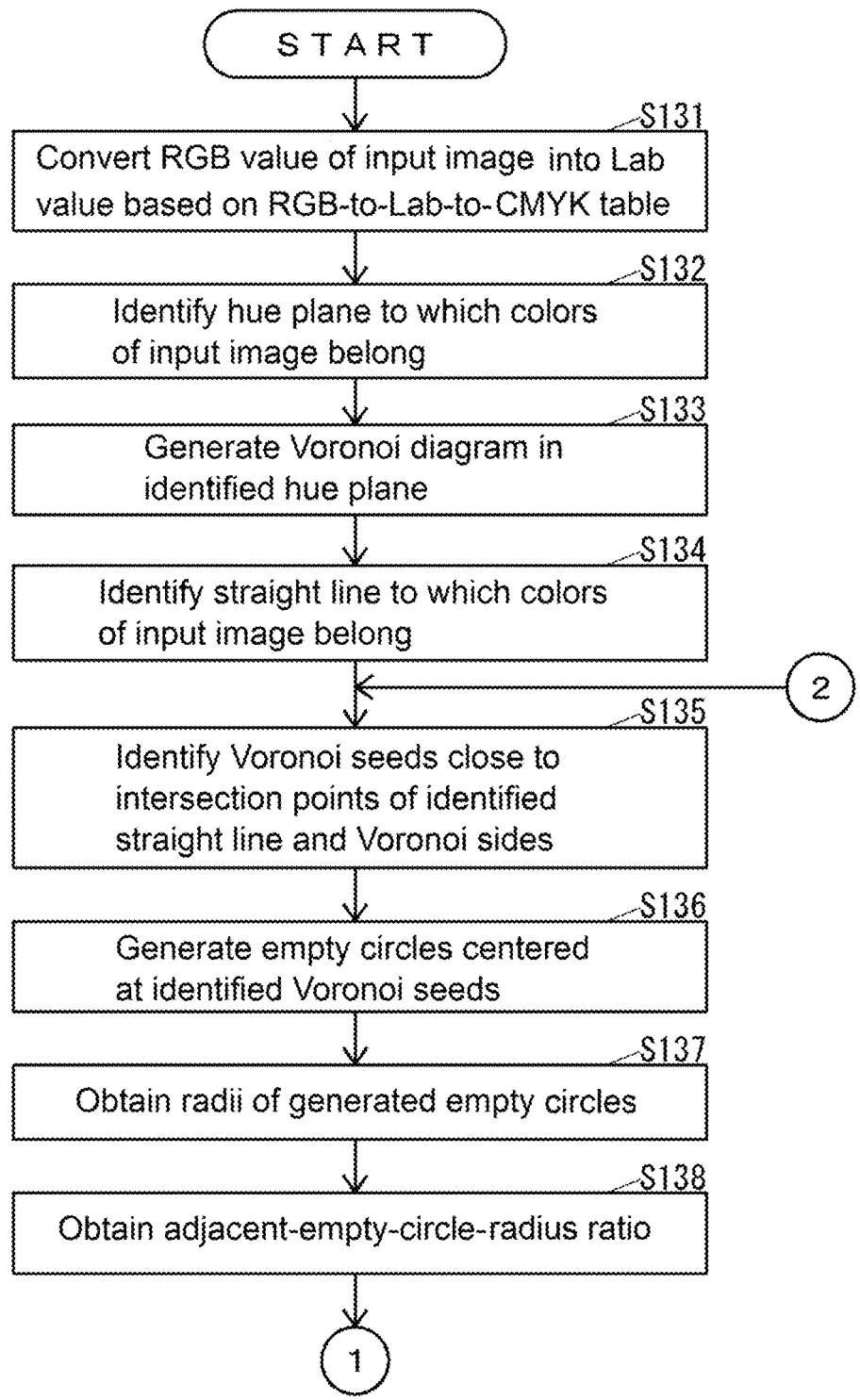
FIG. 5 illustrates a part of the operations of the MFP according to the one embodiment when execution of printing based on an input image with gradation is instructed.
Figure 6:
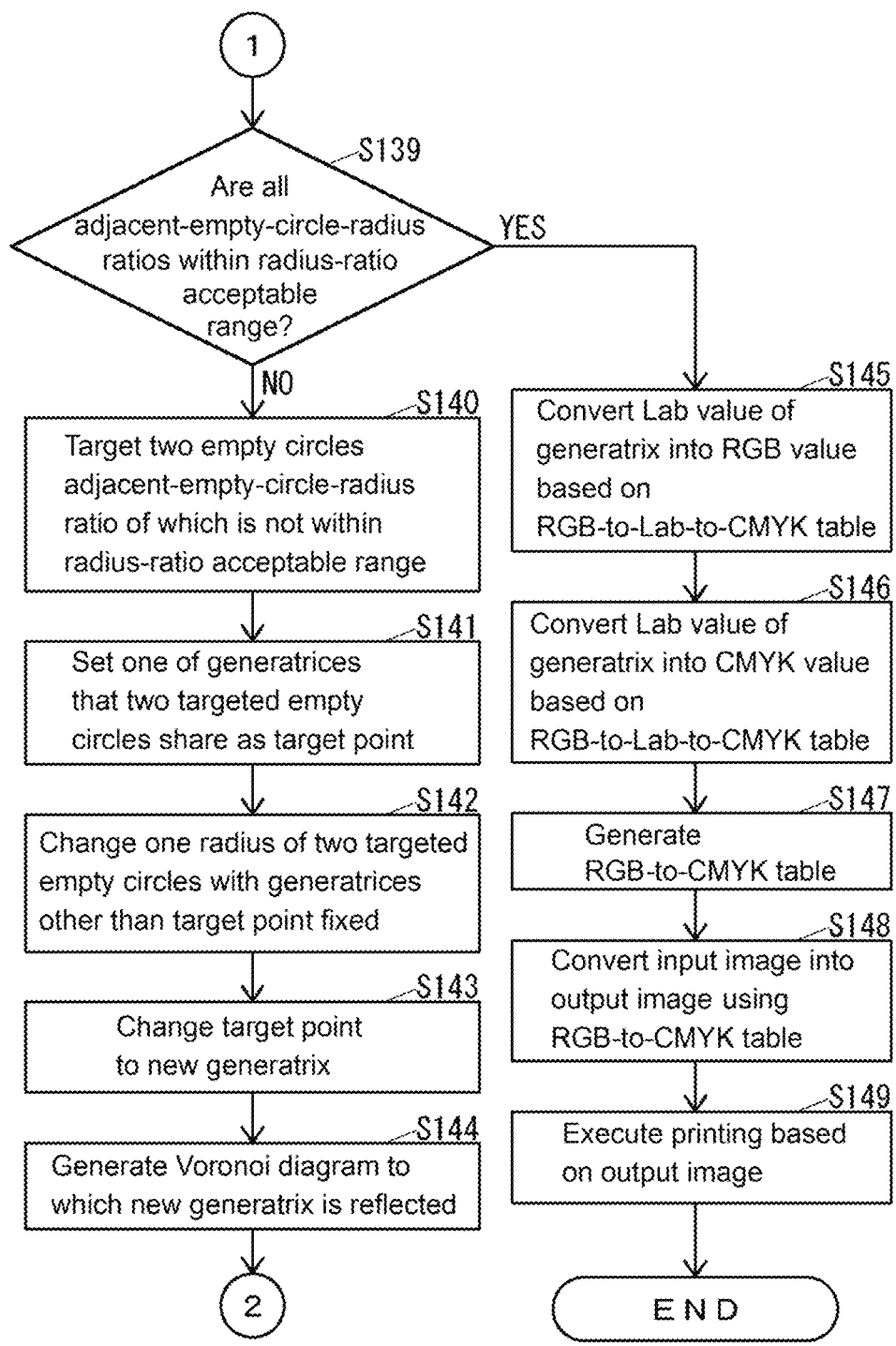
FIG. 6 illustrates a part that is a part of the operations of the MFP according to the one embodiment when execution of printing based on an input image with gradation is instructed and is different from the part illustrated in FIG. 5.

FIG. 5 illustrates a part of the operations of the MFP 10 when the execution of printing based on the input image with gradation is instructed. FIG. 6 illustrates a part that is a part of the operations of the MFP 10 when the execution of printing based on the input image with gradation is instructed and that is different from the part illustrated in FIG. 5.

As illustrated in FIGS. 5 and 6, the table generating unit 18c converts the RGB value of the input image into the Lab value by interpolation calculation using the RGB-to-Lab-to-CMYK table 17b (Step S131).

Next, the table generating unit 18c identifies a hue plane to which the colors of the input image belong, based on the Lab value generated at Step S131 (Step S132).

Subsequently, the table generating unit 18c, in the hue plane identified at Step S132, generates a Voronoi diagram 40 (see FIG. 7) with definition colors, which are defined in the RGB-to-Lab-to-CMYK table 17b, as a generatrix (Step S133).

The Voronoi diagram is a diagram that partitions a closest space from each generatrix, which is present in space using a hyperplane such as a line and a surface. That is, the Voronoi diagram can be defined as a set of Voronoi regions $\{V(p_1), V(p_2), V(p_n)\}$ with respect to a finite subset $P=\{p_1, p_2, \ldots, p_n\}$ within a metric space. Here, the Voronoi region is a region $V(p_i)$ constituted of the following Formula 1 with respect to a distance function d. In the formula shown in Formula 1, $d(p, p_i)$ is a distance between a point p and a point $p_i$, and $d(p, p_j)$ is a distance between a point p and a point $p_j$.

$$V(p_i)=\{p|d(p,p_i)\le d(p,p_j), i\ne j\}$$ Formula 1

The Voronoi diagram has, for example, the following features: a Voronoi side is a perpendicular bisector of adjacent generatrices; and a Voronoi seed is a center of a circle that passes through three adjacent generatrices.

Figure 7:
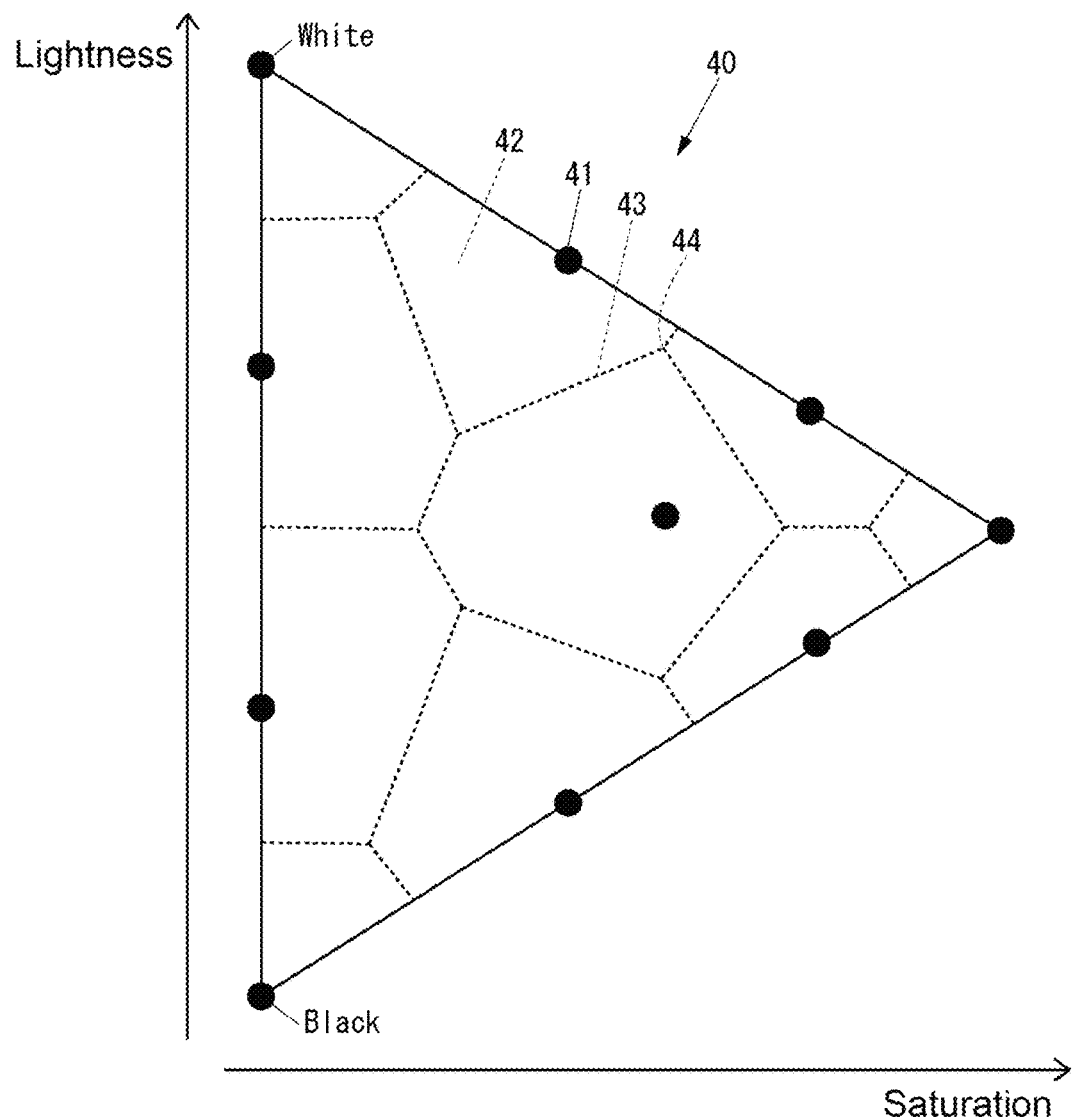
FIG. 7 illustrates one example of a Voronoi diagram generated in the operations illustrated in FIGS. 5 and 6.

FIG. 7 illustrates one example of the Voronoi diagram 40 generated at Step S133.

As illustrated in FIG. 7, the Voronoi diagram 40 includes generatrices 41, Voronoi regions 42 that each include the generatrix 41, Voronoi sides 43 that partition the Voronoi regions 42, and Voronoi seeds 44 that are intersection points of the Voronoi sides 43.

As illustrated in FIGS. 5 and 6, after the process of Step S133, the table generating unit 18c identifies the straight line 33 to which the colors of the input image belong, based on the Lab value generated at Step S131 (Step S134).

Figure 8:
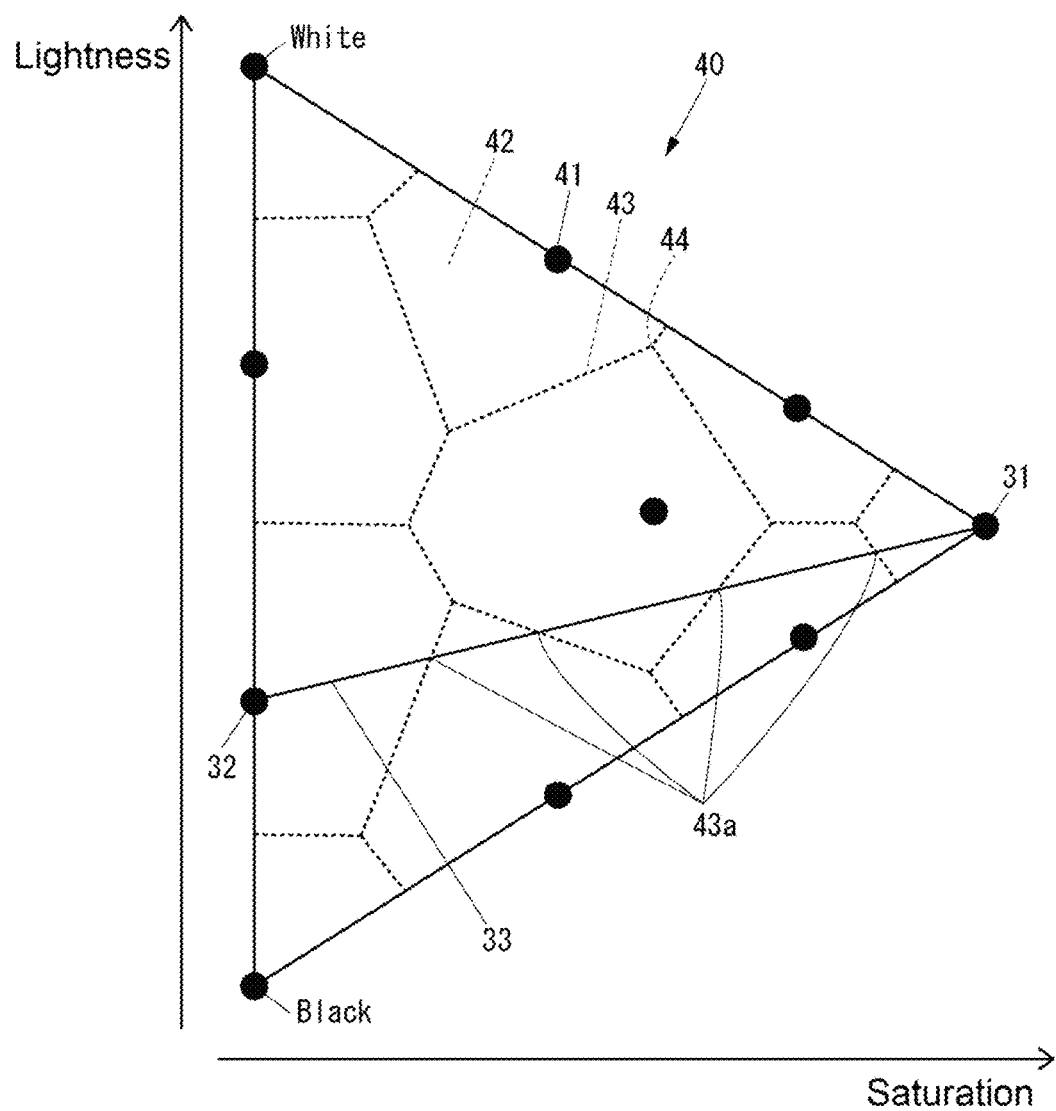
FIG. 8 illustrates one example of a straight line identified in the operations illustrated in FIGS. 5 and 6.

FIG. 8 illustrates one example of the straight line 33 identified at Step S134.

As illustrated in FIG. 8, the straight line 33 intersects with the Voronoi sides 43 at intersection points 43a in the Voronoi diagram 40.

As illustrated in FIGS. 5 and 6, after the process of Step S134, the table generating unit 18c identifies the Voronoi seeds 44 (see FIG. 9) close to the intersection points 43a of the straight line 33 and the Voronoi sides 43, in the Voronoi seeds 44 of both ends of the Voronoi sides 43, which intersect with the straight line 33 identified at Step S134 (Step S135).

Figure 9:
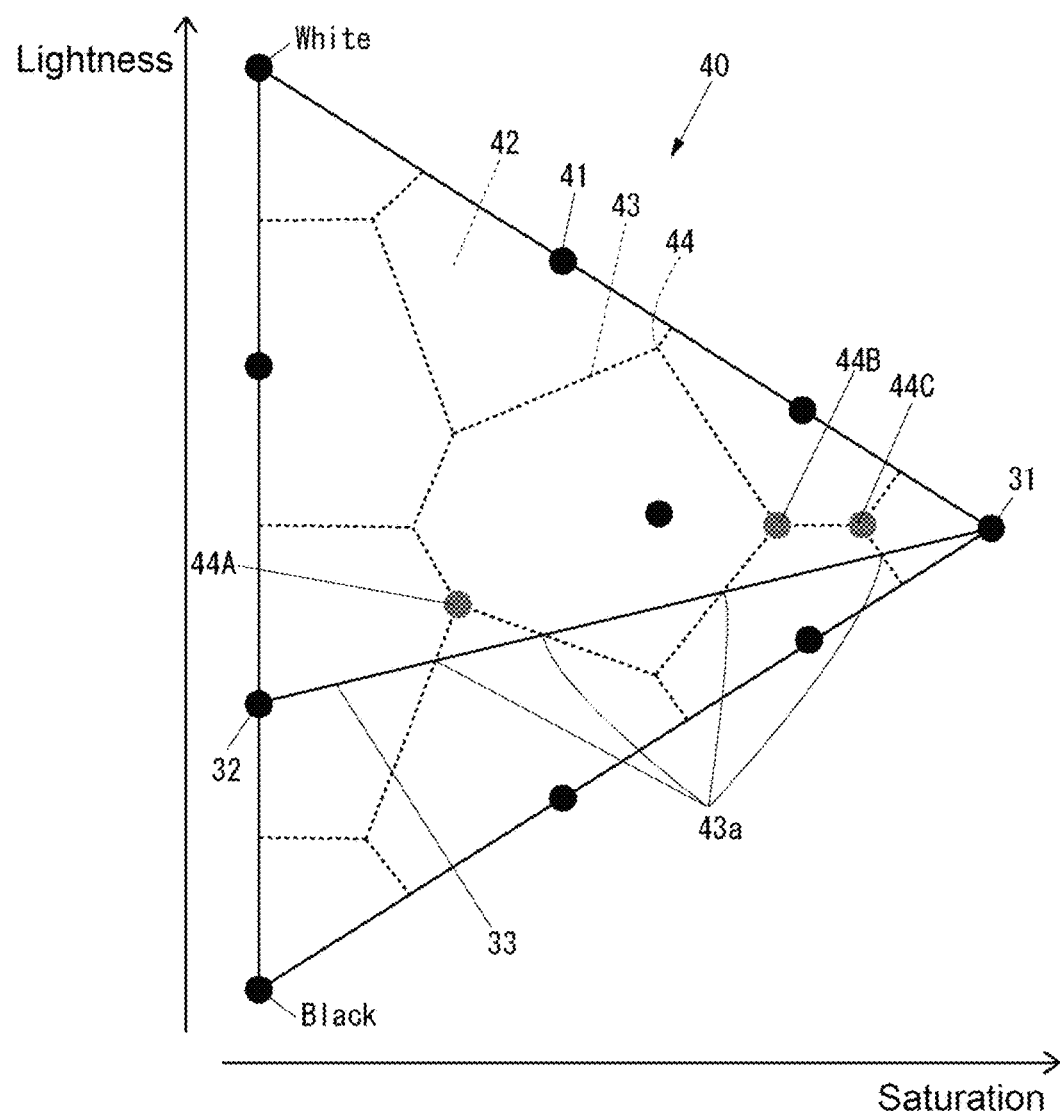
FIG. 9 illustrates one example of Voronoi seeds identified in the operations illustrated in FIGS. 5 and 6.

FIG. 9 illustrates one example of the Voronoi seeds 44 identified at Step S135.

In FIG. 9, Voronoi seeds 44A, 44B, and 44C are illustrated as the Voronoi seeds 44 identified at Step S135.

As illustrated in FIGS. 5 and 6, after the process of Step S135, the table generating unit 18c generates empty circles centered at the Voronoi seeds 44 identified at Step S135 (Step S136). Here, the empty circle is a circle that passes through a generatrix and does not internally include a generatrix.

Figure 10:
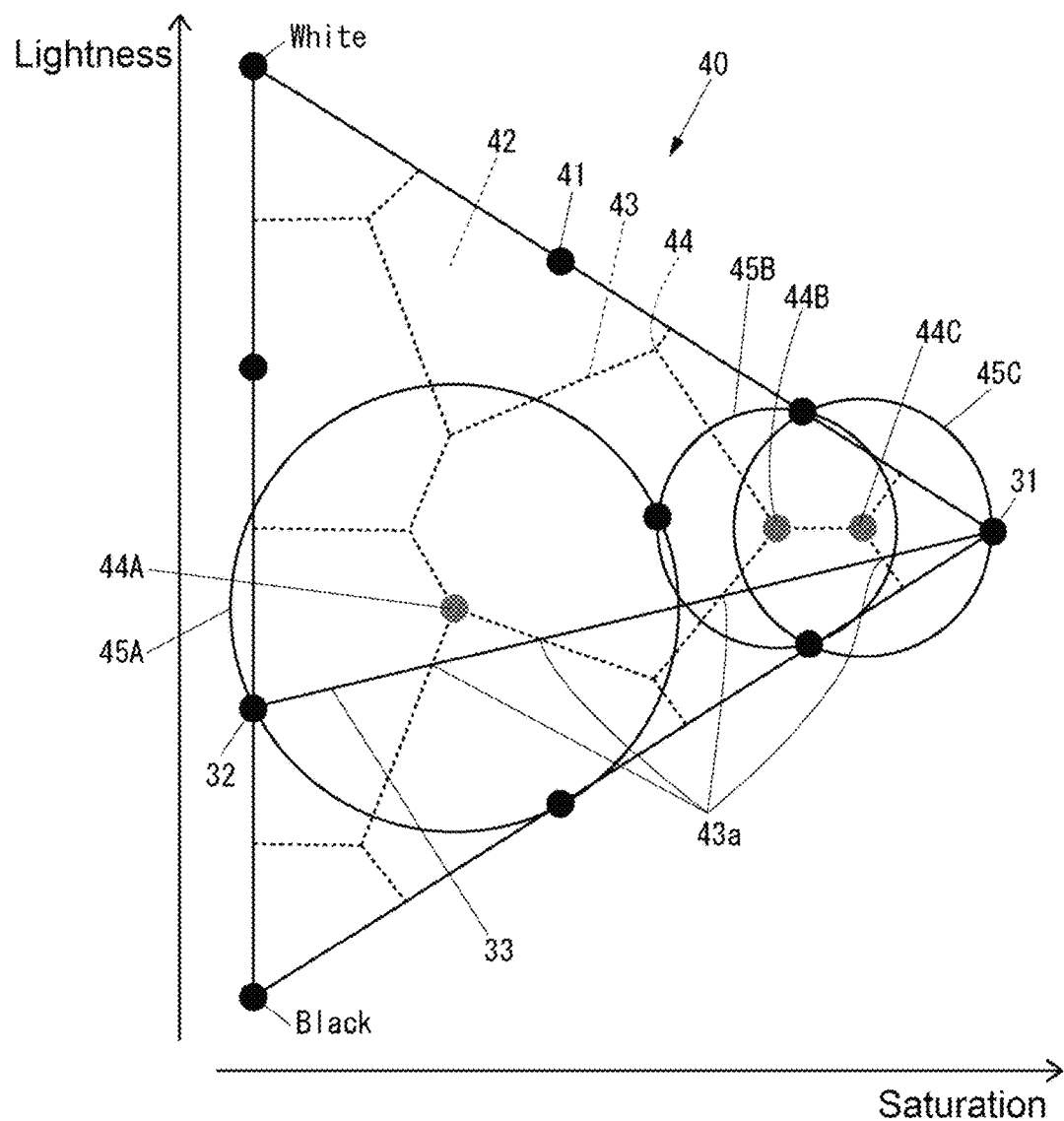
FIG. 10 illustrates one example of empty circles generated in the operations illustrated in FIGS. 5 and 6.

FIG. 10 illustrates one example of the empty circles generated at Step S136.

The Voronoi diagram has a property that a Voronoi seed is present at an equal-distance position from a plurality of generatrices that are close to one another. Consequently, as illustrated in FIG. 10, the Voronoi diagram 40 includes empty circles 45A, 45B, and 45C that pass through the plurality of generatrices 41 and are centered at the Voronoi seeds 44A, 44B, and 44C, respectively.

As illustrated in FIGS. 5 and 6, after the process of Step S136, the table generating unit 18c obtains each radius of the empty circles 45 generated at Step S136 (Step S137).

Subsequently, in order of change of gradation, namely in order of change of saturation, the table generating unit 18c obtains a ratio of radii, which have been obtained at Step S137, between the two adjacent empty circles 45, namely an adjacent-empty-circle-radius ratio (Step S138). Consequently, in the Voronoi diagram 40 illustrated in FIG. 10, the table generating unit 18c obtains the adjacent-empty-circle-radius ratio of the Voronoi seed 44A and the Voronoi seed 44B and the adjacent-empty-circle-radius ratio of the Voronoi seed 44B and the Voronoi seed 44C.

After the process of Step S138, the table generating unit 18c determines whether all the adjacent-empty-circle-radius ratios between the two adjacent empty circles 45 in order of change of gradation are within the radius-ratio acceptable range indicated by the radius-ratio-acceptable-range information 17d or not (Step S139).

When determining that at least a part of the adjacent-empty-circle-radius ratios are not within the radius-ratio acceptable range (that is, outside the radius-ratio acceptable range) at Step S139, the table generating unit 18c targets the two adjacent empty circles 45 the adjacent-empty-circle-radius ratio of which is not within the radius-ratio acceptable range (Step S140).

Subsequently, the table generating unit 18c sets one of the generatrices 41 that the two empty circles 45 targeted at Step S140 share as a target point (Step S141).

Next, while the generatrices 41 other than the generatrix 41, which has been set as the target point at Step S141, is fixed, the table generating unit 18c changes the radius of one of the two empty circles 45 such that the adjacent-empty-circle-radius ratio of the two empty circles 45 targeted at Step S140 falls within the radius-ratio acceptable range (Step S142).

The following describes a method to change the radius at Step S142.

Figure 11:
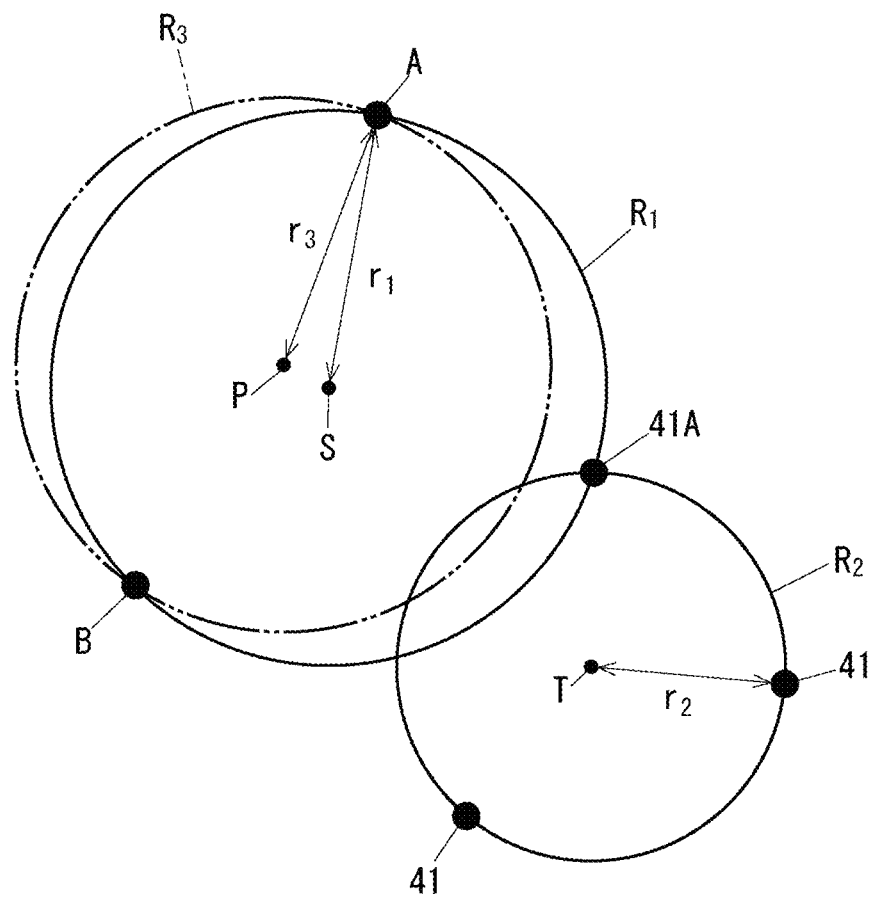
FIG. 11 illustrates one example of two empty circles targeted in the operations illustrated in FIGS. 5 and 6.

FIG. 11 illustrates one example of the two empty circles 45 targeted at Step S140.

As illustrated in FIG. 11, in the two empty circles 45 targeted at Step S140, assume that the empty circle 45 the radius of which is changed at Step S142 is an empty circle $R_1$, and the empty circle 45 the radius of which is not changed at Step S142 is an empty circle $R_2$. Assume that the generatrix 41 that has been set as the target point at Step S141 is a generatrix 41A. Assume that, among the three generatrices 41 of the empty circle $R_1$, the respective generatrices 41 other than the generatrix 41A are a generatrix A and a generatrix B. Assume that coordinates of the generatrix A are $(a_x, a_y)$, and coordinates of the generatrix B are $(b_x, b_y)$. Assume that a circle that passes through the generatrices A and B is a circle $R_3$. The empty circle $R_1$ is a circle that has a radius $r_1$ and is centered at a Voronoi seed S of coordinates $(s_x, s_y)$. The empty circle $R_2$ is a circle that has a radius $r_2$ and is centered at a Voronoi seed T of coordinates $(t_x, t_y)$. The circle $R_3$ is a circle that has a radius $r_3$ and is centered at a point P of coordinates $(p_x, p_y)$.

Figure 12:
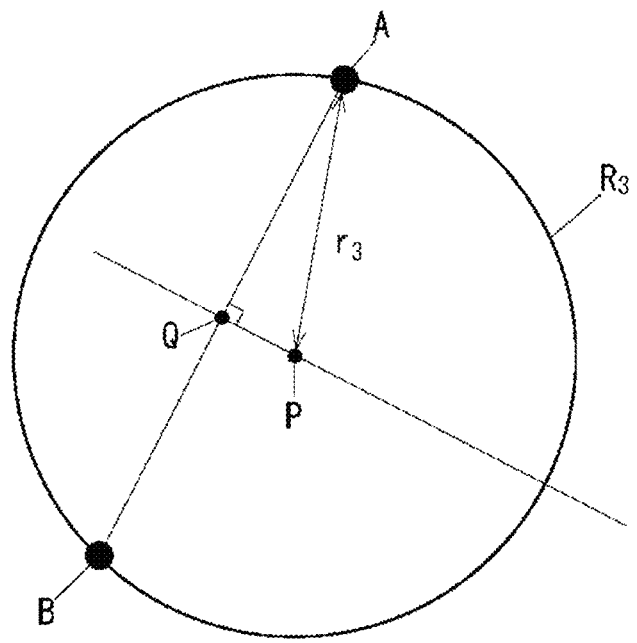
FIG. 12 illustrates the circle illustrated in FIG. 11.

FIG. 12 illustrates the circle $R_3$.

As illustrated in FIG. 12, the point P is a point on a perpendicular bisector of a line segment AB.

Assuming that coordinates of a midpoint Q of the line segment AB are $(q_x, q_y)$ expresses $q_x$ by the formula shown in the following Formula 2 and expresses $q_y$ by the formula shown in the following Formula 3.

$$q_x = \frac{a_x + b_x}{2} \qquad \text{Formula 2}$$

$$q_y = \frac{a_y + b_y}{2} \qquad \text{Formula 3}$$

The inclination of the line segment AB is expressed with $(b_y-a_y)/(b_x-a_x)$. Consequently, the inclination of the perpendicular bisector of the line segment AB is expressed with $-(b_x-a_x)/(b_y-a_y)$. Then, since the perpendicular bisector of the line segment AB passes through the midpoint Q, it is expressed by the formula shown in the following Formula 4.

$$y = -\frac{b_x - a_x}{b_y - a_y}(x - q_x) + q_y \qquad \text{Formula 4}$$

The point P is, as described above, a point on the perpendicular bisector of the line segment AB. Consequently, based on the formulae shown in Formula 2 to Formula 4, $p_x$ and $p_y$ satisfy the formula shown in the following Formula 5.

$$p_y = -\frac{b_x - a_x}{b_y - a_y}\left(p_x - \frac{a_x + b_x}{2}\right) + \frac{a_y + b_y}{2} \qquad \text{Formula 5}$$

With Pythagorean theorem on a right triangle AQP, the formula shown in the following Formula 6 is satisfied. Consequently, based on the formulae shown in Formula 2, Formula 3 and Formula 6, $p_x$ and $p_y$ satisfy the formula shown in the following Formula 7.

$$\{(a_x - q_x)^2 + (a_y - q_y)^2\} + \{(q_x - p_x)^2 + (q_y - p_y)^2\} = r_3^2 \qquad \text{Formula 6}$$

$$\left\{\left(a_x - \frac{a_x + b_x}{2}\right)^2 + \left(a_y - \frac{a_y + b_y}{2}\right)^2\right\} + \left\{\left(\frac{a_x + b_x}{2} - p_x\right)^2 + \left(\frac{a_y + b_y}{2} - p_y\right)^2\right\} = r_3^2 \qquad \text{Formula 7}$$

Here, as illustrated in FIG. 11, in order for the empty circle $R_2$ and the circle $R_3$ to intersect with one another, a length of a line segment TP is required to be equal to or less than a total of the radius $r_2$ of the empty circle $R_2$ and the radius $r_3$ of the circle $R_3$. This requires that the formula shown in the following Formula 8 be satisfied.

$$\sqrt{(t_x-p_x)^2+(t_y-p_y)^2} \leq r_2+r_3 \qquad \text{Formula 8}$$

Assume that the upper-limit value of the radius-ratio acceptable range is expressed with a. Then, since $r_1/r_2 > a$ when the radius $r_1$ of the empty circle $R_1$ is larger than the radius $r_2$ of the empty circle $R_2$, assuming that the circle where the radius $r_1$ of the empty circle $R_1$ is changed at Step S142 is the circle $R_3$ causes a relationship between the radius $r_3$ of the circle $R_3$ and the radius $r_2$ of the empty circle $R_2$ to satisfy $r_3/r_2 = a$. Assume that the upper-limit value of the radius-ratio acceptable range is expressed with a. Then, since $r_1/r_{2<1}/a$ when the radius $r_1$ of the empty circle $R_1$ is smaller than the radius $r_2$ of the empty circle $R_2$, assuming that the circle where the radius $r_1$ of the empty circle $R_1$ is changed at Step S142 is the circle $R_3$ causes a relationship between the radius $r_3$ of the circle $R_3$ and the radius $r_2$ of the empty circle $R_2$ to satisfy $r_3/r_2 = 1/a$. That is, the radius $r_3$ of the circle $R_3$ is expressed by the formula shown in the following Formula 9, with the upper-limit value a of the radius-ratio acceptable range and the radius $r_2$ of the empty circle $R_2$.

$$\text{In the case of } r_1 > r_2 \quad r_3 = ar_2 \qquad \text{Formula 9}$$

$$\text{In the case of } r_1 < r_2 \quad r_3 = \frac{r_2}{a}$$

Assume that the circle where the radius $r_1$ of the empty circle $R_1$ is changed at Step S142 is the circle $R_3$, the table generating unit 18c can obtain the radius $r_3$ of the circle $R_3$ and the coordinates $(p_x, p_y)$ of the center point P of the circle $R_3$, based on the formulae shown in Formulae 5, 7, 8, and 9.

As illustrated in FIGS. 5 and 6, after the process of Step S142, the table generating unit 18c changes the generatrix 41, which has been set as the target point at Step S141, to a new generatrix 41B (see FIG. 13) that, among the two empty circles 45 targeted at Step S140, is based on the empty circle 45 where the radius is not changed and the empty circle 45 where the radius is changed (Step S143).

Figure 13:
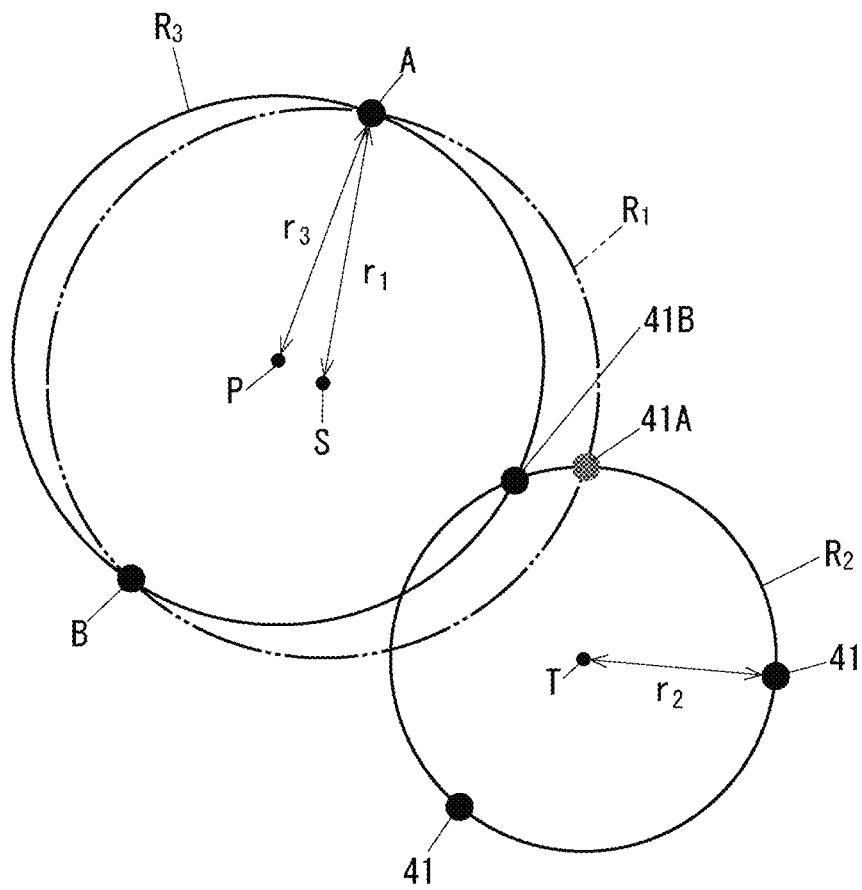
FIG. 13 illustrates a new generatrix obtained in the operations illustrated in FIGS. 5 and 6.

FIG. 13 illustrates the new generatrix 41B obtained at Step S143.

As illustrated in FIG. 13, the table generating unit 18c, among intersection points of the empty circle 45 where the radius is not changed, namely the empty circle $R_2$, and the empty circle 45 where the radius is changed, namely the circle $R_3$ of the two empty circles 45 targeted at Step S140, sets an intersection point close to the generatrix 41, which has been set as the target point at Step S141, namely the generatrix 41A as the new generatrix 41B.

As illustrated in FIGS. 5 and 6, after the process of Step S143, the table generating unit 18c generates the Voronoi diagram 40 that reflects the new generatrix 41B (Step S144), and executes the process of Step S135 again using the Voronoi diagram 40 generated at Step S144.

Figure 14:
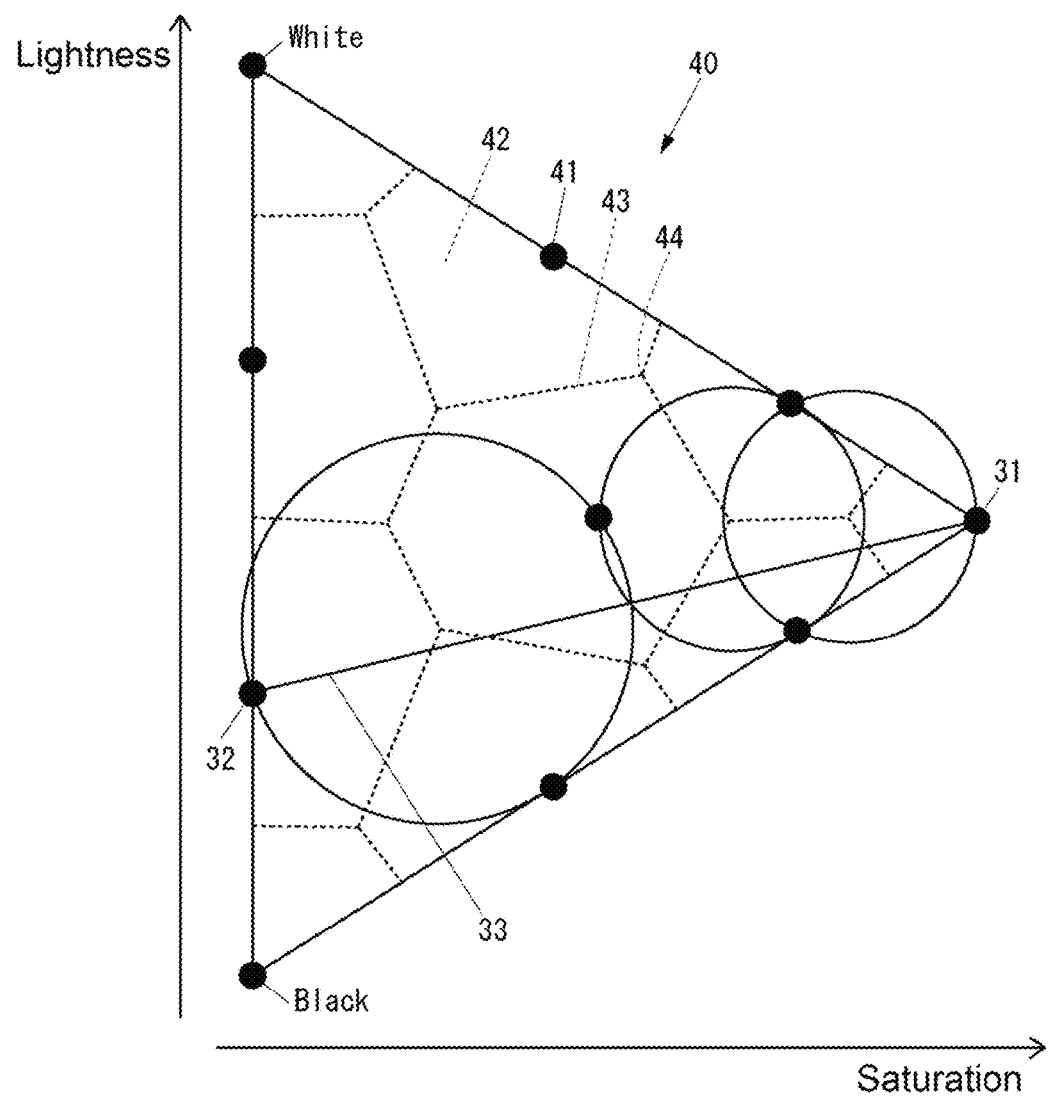
FIG. 14 illustrates one example of a Voronoi diagram modified by the operations illustrated in FIGS. 5 and 6.

FIG. 14 illustrates one example of the Voronoi diagram 40 modified by the operations illustrated in FIGS. 5 and 6.

The Voronoi diagram 40 illustrated in FIG. 14 has the improved uniformity of the arrangement of the generatrices 41 in the proximity of the straight line 33, compared with the Voronoi diagram 40 illustrated in FIG. 10.

As illustrated in FIGS. 5 and 6, when determining that all the adjacent-empty-circle-radius ratios are within the radius-ratio acceptable range at Step S139, the table generating unit 18c converts the Lab values of all the generatrices 41 on the Voronoi diagram 40 into the RGB values by interpolation calculation using the RGB-to-Lab-to-CMYK table 17b (Step S145).

Subsequently, the table generating unit 18c converts the Lab values of all the generatrices 41 on the Voronoi diagram 40 into the CMYK values by interpolation calculation using the RGB-to-Lab-to-CMYK table 17b (Step S146).

Subsequently, the table generating unit 18c associates the RGB values generated at Step S145 and the CMYK values generated at Step S146 with each of the generatrices 41 to generate the RGB-to-CMYK table 17c (Step S147).

Subsequently, the color conversion unit 18b converts the input image into the output image using the RGB-to-CMYK table 17c generated at Step S147 (Step S148).

Subsequently, the control unit 18 executes printing with the printer 14 based on the output image generated at Step S148 (Step S149), and terminates the operations illustrated in FIGS. 5 and 6.

Next, a description will be given of operations of the MFP 10 when execution of printing based on an input image other than the input image with gradation is instructed.

Figure 15:
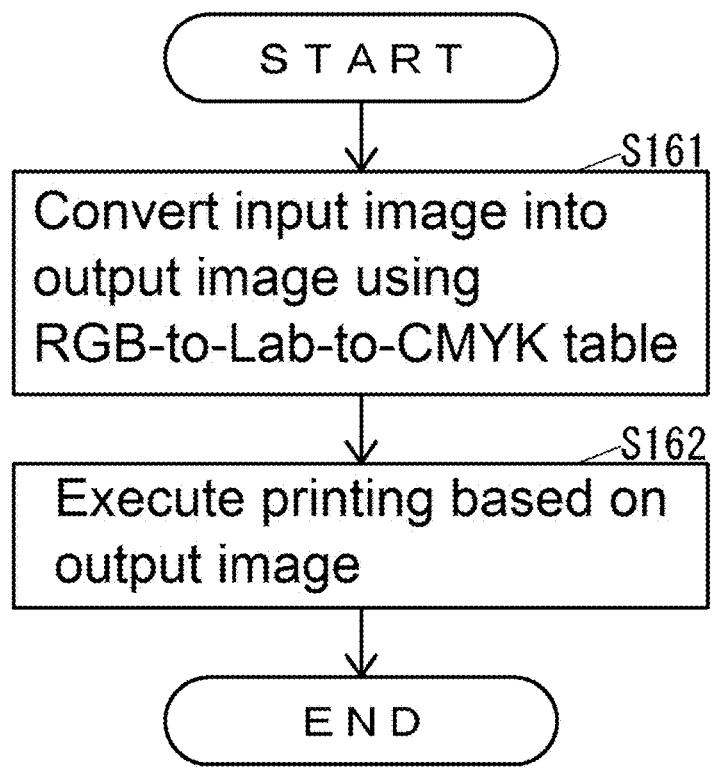
FIG. 15 illustrates operations of the MFP according to the one embodiment when execution of printing based on an input image other than the input image with gradation is instructed.

FIG. 15 illustrates the operations of the MFP 10 when execution of printing based on the input image other than the input image with gradation is instructed.

As illustrated in FIG. 15, the color conversion unit 18b converts the input image into the output image using the RGB-to-Lab-to-CMYK table 17b (Step S161).

Subsequently, the control unit 18 executes printing with the printer 14 based on the output image generated at Step S161 (Step S162), and terminates the operations illustrated in FIG. 15.

As described above, since the MFP 10 generates the RGB-to-CMYK table 17c from the RGB-to-Lab-to-CMYK table 17b with the Voronoi diagram 40 so as to convert the colors on the straight line 33, which passes through the largest saturation color and the smallest-saturation and specific-lightness color in a specific hue plane, with high accuracy (Steps S131 to S147) This easily ensures a high-accurate color conversion with respect to the input image with gradation constituted of the colors on the straight line 33.

The MFP 10 executes the color conversion with an accuracy that corresponds to a preference of a user by accepting designation of the radius-ratio acceptable range (Steps S101 to S104), and thus ensures the improved convenience.

In the above-described embodiment, among the Voronoi seeds 44 of both the ends of the Voronoi sides 43, which intersect with the straight line 33, the Voronoi seeds 44 close from the intersection points 43a of the straight line 33 and the Voronoi sides 43 are identified as the centers of the empty circles. However, among the Voronoi seeds 44 of both the ends of the Voronoi sides 43, which intersect with the straight line 33, the Voronoi seeds 44 that are far from the intersection points 43a of the straight line 33 and the Voronoi sides 43 may be identified as the centers of the empty circles, or the Voronoi seeds 44 of both the ends of the Voronoi sides 43, which intersect with the straight line 33, may be identified as the centers of the empty circles.

While the image forming apparatus of the disclosure is the MFP in the embodiment, an image forming apparatus other than an MFP, such as a printer-only machine, may be applicable.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming apparatus comprising:
a central processing unit (CPU);
a storage device that stores an image forming program; and
a print device that executes printing on a recording medium; wherein
the CPU executes the image forming program to function as
  a table generating unit that generates a second color conversion table based on a first color conversion table, the first color conversion table defining a correspondence relationship between color values of a colorimetric system of an input image and color values of a colorimetric system of an output image for printing by the print device, with respect to a specific count of colors, and
  a color conversion unit that converts the input image into the output image using the second color conversion table generated by the table generating unit, wherein
  the table generating unit, in a Voronoi diagram in a specific hue plane that includes generatrices corresponding to definition colors defined in the first color conversion table, obtains empty circles as circles centered at Voronoi seeds of ends of Voronoi sides that intersect with a straight line passing through a largest saturation color and a smallest-saturation and specific-lightness color and passes through generatrices, the circle being without the generatrix inside the circle, and
  after the table generating unit, among the obtained empty circles, sets one of the generatrices shared by the two adjacent empty circles whose radius ratio is outside a specific range as a target point, and causes the radius ratio of the two empty circles to be within the specific range by changing at least one radius of the two empty circles while the generatrix other than the target point is fixed, the table generating unit generates the second color conversion table that sets a color that corresponds to an intersection point corresponding to the target point among the intersection points of the two empty circles, as the definition colors.

2. The image forming apparatus according to claim 1, wherein the CPU executes the image forming program to further function as a range accepting unit that accepts designation of the specific range.

3. A non-transitory computer-readable recording medium storing an image forming program to control an image forming apparatus including a print device that executes printing on a recording medium, the image forming program causing the image forming apparatus to function as:
a table generating unit that generates a second color conversion table based on a first color conversion table, the first color conversion table defining a correspondence relationship between color values of a colorimetric system of an input image and color values of a colorimetric system of an output image for printing by the print device, with respect to a specific count of colors; and
a color conversion unit that converts the input image into the output image using the second color conversion table generated by the table generating unit; wherein
the table generating unit, in a Voronoi diagram in a specific hue plane that includes generatrices corresponding to definition colors defined in the first color conversion table, obtains empty circles as circles centered at Voronoi seeds of ends of Voronoi sides that intersect with a straight line passing through a largest saturation color and a smallest-saturation and specific-lightness color and passes through generatrices, the circle being without the generatrix inside the circle, and after the table generating unit, among the obtained empty circles, sets one of the generatrices shared by the two adjacent empty circles whose radius ratio is outside a specific range as a target point, and causes the radius ratio of the two empty circles to be within the specific range by changing at least one radius of the two empty circles while the generatrix other than the target point is fixed, the table generating unit generates the second color conversion table that sets a color that corresponds to an intersection point corresponding to the target point among the intersection points of the two empty circles, as the definition colors.

* * * * *